United States Patent Office 3,100,774
Patented Aug. 13, 1963

---

3,100,774
PHOSPHORUS BORON COMPOUNDS
Theodor Reetz, Webster Groves, Mo., assignor to Monsanto Chemical Company, St. Louis, Mo., a corporation of Delaware
No Drawing. Filed July 29, 1959, Ser. No. 830,197
20 Claims. (Cl. 260—293)

This invention relates to a new class of phosphorus boron compounds and to the method of preparing the same. Moore particularly, it is concerned with new compounds which may be designated as hydrocarbon substituted phosphorous triamide boranes.

My copending application Serial No. 807,327, filed April 20, 1959, now abandoned, describes novel phosphorus boron compounds of the general formula $H_3BP(OR)_3$. The present invention, while containing the borine group, deals with compounds wherein nitrogen is present rather than oxygen. These latter compounds are hydrocarbon substituted phosphorous triamides. The borine group is apparently coordinatively bound to the trivalent phosphorus atom which supplies the necessary electrons for the bond.

It is therefore an object of this invention to provide new nitrogen containing phosphorus boron compounds. It is a further object to provide phosphorus boron compounds which exhibit a surprising degree of stability. Still a further object is to provide a method for the preparation of these novel nitrogen containing phosphorus boron compounds. These and other objects, advantages and features of the invention will become apparent upon consideration of the following description thereof.

The structural formula of the new compounds of this invention is:

$$H_3BP\begin{matrix}X\\-X'\\X''\end{matrix}$$

where X, X' and X'' are like or unlike amine radicals selected from the group consisting of

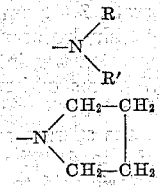

and

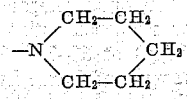

wherein R and R' are like or unlike organic radicals or hydrogen provided that no more than one hydrogen be bonded to any one nitrogen atom. Illustrative, but not limitative, of the organic radicals represented by R and R' are the alkyl radicals, such as methyl, ethyl, propyl, isopropyl, butyl, hexyl, octyl, dodecyl, β-chloroethyl, 2-methylpentyl, 2-ethylhexyl, etc.; unsaturated aliphatic radicals such as propenyl, butenyl, etc.; aryl radicals such as phenyl, napthyl, etc.; substituted aryl radicals such as chlorophenyl, 2,4-dibromophenyl, ethylphenyl, etc.; aralkyl radicals such as benzyl, phenylethyl, etc.; alicyclic radicals such as cyclohexyl, cyclopentyl, etc.; and hetrocyclic radicals such as furyl, furfuryl, thienyl, etc. A preferred embodiment of this invention consists of those compounds wherein R and R' are selected from the group consisting of hydrogen and alkyl radicals containing from 1 to 12 carbons provided that no more than one hydrogen atom be bonded to any one nitrogen atom. It should also be noted that in the case of the tetramethylene and pentamethylene, the nitrogen rings, the hydrogen atoms on said rings may be substituted by an alkyl radical, preferably having from 1 to 4 carbon atoms, and by the halogens.

Phosphorous triamide borane, $H_3BP(NH_2)_3$, was recently reported by Kodama.

However, the compounds of this invention are phosphorous triamide boranes having a hydrocarbon radical substituted for at least one hydrogen on each nitrogen atom and display a markedly superior stability. Of the known compounds containing the $BH_3$ group, perhaps the most stable are the trialkylamine boranes of which trimethylamine borane is a noteworthy example. It has been determined that the borine containing compounds disclosed herein are considerably more stable as evidenced by the following experiments.

When trimethylamine borane is mixed in a closed system with hexamethyl phosphorous triamide in equimolar amounts at room temperature, the conversion is in excess of 80% according to the following equation:

(I) $H_3BN(CH_3)_3 + P[N(CH_3)_2]_3$
$\rightleftharpoons H_3BP[N(CH_3)_2]_3 + N(CH_3)_3$ When trimethylamine borane is treated with concentrated hydrochloric acid and methanol (1:1), within two hours about 90% of the product is decomposed. In the case of hexamethyl phosphorous triamide borane, only about 18% decomposition occurs under the same conditions. The following test is also illustrative of the greater stability of these phosphorus boron compounds in comparison with trimethylamine borane. N,N',N''-(tetramethylene) phosphorous triamide borane can be precipitated from a solution thereof in concentrated hydrochloric acid, by dilution with water and recovered unchanged. Under the same conditions, trimethylamine borane is completely decomposed with strong evolution of hydrogen.

In accordance with this invention the new compounds are prepared from phosphorous triamides of the formula

where X has the meaning disclosed above with a compound of the class which is capable of releasing borine. Compounds of this class include the trialkylamine boranes such as trimethylamine borane, triethylamine borane and the like; boron hydrides such as diborane; and the metallic borohydrides such as the alkali metal borohydrides, e.g. sodium, potassium, etc. borohydride, when employed in the presence of such promoters as (a) carbonyl containing compounds, (b) organic acids, and (c) inorganic acids. Suitable carbonyl containing compounds include carbon dioxide, ketones such as dimethyl ketone, diethyl ketone and the like, aldehydes such as acetaldehyde, isobutyraldehyde and the like, and esters such as ethyl acetate, methyl propionate and the like. Inorganic acids such as hydrochloric, hydrobromic and hydrofluoric and organic acids such as formic, acetic, butyric, valeric and the like are also suitable. Illustrative of the reactions which take place are the following:

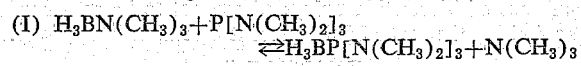

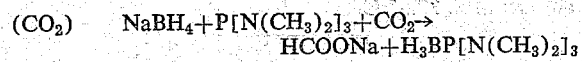

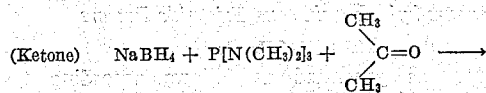

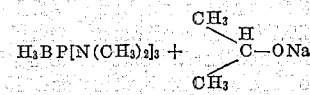

(Organic acid) NaBH$_4$+P[N(CH$_3$)$_2$]$_3$
+CH$_3$COOH→H$_3$BP[N(CH$_3$)$_2$]$_3$+CH$_3$COONa+H$_2$ (Inorganic acid) NaBH$_4$+P[N(CH$_3$)$_2$]$_3$
+HCl→H$_3$BP[N(CH$_3$)$_2$]$_3$+NaCl+H$_2$ The temperatures at which the phosphorous triamides are reacted with the borine releasing compounds will vary depending upon the nature of the latter. With the trialkylamine boranes, temperatures from 20° to 120° C. may be employed, the preferred range being from 70° to 100° C. In the case of diborane lower temperatures ranging from −30° to 60° C. are more desirable. When metallic borohydrides are employed temperatures may vary from −40° to 100° C., and usually the reaction is carried out in the presence of ether as a solvent, as, for example, ethyl ether, dioxane, tetrahydrofuran and the like.

The invention will be more fully understood by reference to the following examples which provide an indication of suitable reactants, solvents, and the proportions of each as well as temperatures to be used in preparing the novel nitrogen containing phosphorus boron compounds. These examples, however, are given for the purpose of illustration only, and are not to be construed as limiting the scope of the present invention in any way.

EXAMPLE I

Hexamethyl Phosphorous Triamide Borane

H$_3$BP[N(CH$_3$)$_2$]$_3$

A mixture of 3.64 grams of trimethylamine borane and 8.20 grams of hexamethyl phosphorous triamide was heated with stirring up to 90° C., maintained at that temperature for about 20 minutes, and then raised to 110° C. and held there for a short time. At 70–80° C. a moderate, and at 90° C. a strong, evolution of trimethylamine was observed. 2.6 grams (88% of theory) of trimethylamine was condensed in a trap. The reaction product, 9.2 grams, was distilled at 61–63° C./0.5 mm. The distillate was dissolved in dioxane. Addition of water to the dioxane solution caused an oily product to separate. This oily product became crystalline on standing for a short time. It was then dried and distilled. One fraction, B.P. 49–50° C./0.1 mm. was taken. It was identified as hexamethyl phosphorous triamide borane; M.P. 32.5° C.

EXAMPLE II

Hexamethyl Phosphorous Triamide Borane

H$_3$BP[N(CH$_3$)$_2$]$_3$

A solution of 14.56 grams of trimethylamine borane and 35.8 grams of hexamethyl phosphorous triamide in 50 ml. of dioxane was gradually heated to about 112° C. within about 90 minutes. A rather rapid evolution of trimethylamine was observed at 85–90° C. Nitrogen was passed slowly through the contents of the reaction vessel at the end of the reaction. 11.0 grams (93% of theory) of trimethylamine was collected in a trap. The reaction product was filtered and dilute hydrochloric acid added to the filtrate to remove the excess hexamethyl phosphorous triamide and to dissolve the dioxane. An oil precipitated and became crystalline on standing. The crystalline product was separated by filtration, washed with water and dried. There was obtained 30.5 grams (86% of theory) of hexamethyl phosphorous triamide borane; M.P. 32.5° C.

EXAMPLE III

Hexamethyl Phosphorous Triamide Borane

H$_3$BP[N(CH$_3$)$_2$]$_3$

Diborane was generated as follows according to Schlesinger's method (JACS 75, 1953, pp. 202–207). 29.75 grams of boron fluoride etherate diluted with 30 ml. of ether were added to a stirred mixture of 5.7 grams of sodium borohydride and 80 ml. of tetrahydrofuran in a flask at −40° C. in about 45 minutes. Then the reaction mixture was heated gradually to about 58° C. Nitrogen was then passed slowly through the contents of the flask.

The diborane evolved was introduced into another flask which contained a solution of 35 grams of hexamethyl phosphorous triamide in 50 ml. of tetrahydrofuran. Vigorous stirring and cooling at about −20° was maintained. After all of the diborane was introduced, the reaction mixture was heated to room temperature, and then most of the solvent was stripped off by distillation. Then a sufficient amount of dilute hydrochloric acid was added to dissolve the remaining solvent and the excess hexamethyl phosphorous triamide. The oil which separated crystallized on standing. The crystalline product was filtered and dried on air. There was obtained 31.6 grams (89% of theory) of hexamethyl phosphorous triamide borane; M.P. 32.5° C.

EXAMPLE IV

Hexamethyl Phosphorous Triamide Borane

H$_3$BP[N(CH$_3$)$_2$]$_3$

Carbon dioxide was gradually introduced at 25° C. into a stirred mixture of 17.9 grams of hexamethyl phosphorous triamide, 3.78 grams of sodium borohydride and 50 ml. of tetrahydrofuran until the reaction was completed and no further carbon dioxide was absorbed. The reaction product was treated with sufficient dilute hydrogen chloride to precipitate an oily product and dissolve the excess hexamethyl phosphorous triamide as well as the solvent. The oily product was taken up with hexane and filtered from a small amount of yellow insoluble solid present therein. The filtrate was evaporated, and the residue was dissolved in dioxane. The addition of water to this solution caused an oil to precipitate which became crystalline upon standing. The crystalline product was filtered and dried. A yield of 11.5 grams (65% of theory) of hexamethyl phosphorous triamide borane was obtained.

EXAMPLE V

Hexaethyl Phosphorous Triamide Borane

H$_3$BP[N(C$_2$H$_5$)$_2$]$_3$

Diborane was generated from the reaction of 15.5 grams of boron fluoride etherate, 3.4 grams of sodium borohydride and 70 ml. of tetrahydrofuran (see Example III). The diborane thus generated was introduced into a flask and reacted with 24.7 grams of hexaethyl phosphorous triamide dissolved in 50 ml. of tetrahydrofuran. Throughout the reaction, vigorous stirring and a temperature of about 10° C. were maintained. The flask was then shaken with dilute hydrochloric acid to destroy and dissolve any unreacted hexaethyl phosphorous triamide. An oil precipitated which was washed with water and dried in a vacuum (5 mm. of Hg) at 60–70° C. A yield of 22.5 grams (86% of theory) of hexaethyl phosphorous triamide borane was obtained.

EXAMPLE VI

Hexa-n-Butyl Phosphorous Triamide Borane

H$_3$BP[N(n-C$_4$H$_9$)$_2$]$_3$

Diborane was generated from the reaction of 18.6 grams of boron fluoride etherate, 4.1 grams of sodium borohydride and 70 ml. of tetrahydrofuran (see Example III). The diborane so generated was introduced into a flask containing 41.5 grams of hexa-n-butyl phosphorous triamide and 30 ml. of tetrahydrofuran. The reaction mixture was stirred vigorously, and a temperature of 25–30° C. was maintained. The mixture was then treated with sufficient dilute hydrochloric acid to dissolve the solvent and destroy any excess of hexa-n-butyl phosphorous triamide. An oily product separated and was washed with dilute solution of sodium sulfate. Said product was then separated from the solution and subjected to vacuum (4 mm. of Hg) at about 80° C. There was obtained 39.5 grams (92% of theory) of hexa-n-butyl phosphorous triamide borane.

EXAMPLE VII

N,N',N''-(Tetramethylene) Phosphorous Triamide Borane

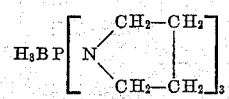

A mixture of 5.3 grams of N,N',N''-(tetramethylene) phosphorous triamide, 1.46 grams of trimethylamine borane and 2 ml. of dioxane was gradually heated to about 130° C. Trimethylamine was evolved at 60–70° C. The mixture was then treated with sufficient 0.5 n hydrochloric acid to dissolve the excess of N,N',N''-(tetramethylene) phosphorous triamide. A white crystalline precipitate appeared and was dissolved in concentrated hydrochloric acid and precipitated by the addition of water. The latter precipitate was then filtered, washed with water, and dried in vacuum. A yield of 4.8 grams (94% of theory) of N,N',N''-(tetramethylene) phosphorous triamide borane was obtained; M.P. 59° C.

EXAMPLE VIII

Hexamethyl Phosphorous Triamide Borane

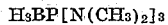

A solution of 3 grams of water and 12 grams of acetone was added portionwise to a mixture of 1.9 grams of sodium borohydride, 9 grams of hexamethyl phosphorous triamide and 27 ml. of tetrahydrofuran with vigorous stirring at about 27° C. over a period of three hours. The mixture was then heated at about 55° C. for 30 minutes, after which 25 ml. of water was added dropwise at 40° C. The resulting reaction mixture was rendered acidic with dilute hydrochloric acid and stirred until the unreacted hexamethyl phosphorous triamide was destroyed. An oil precipitated and became crystalline on cooling. The white crystalline product was filtered, washed with water and dried on air. There was obtained 4.7 grams (53% of theory) of hexamethyl phosphorous triamide borane.

EXAMPLE IX

Hexamethyl Phosphorous Triamide Borane

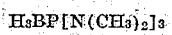

3 grams of acetic acid dissolved in 10 ml. of tetrahydrofuran was added dropwise to a mixture of 1.9 grams of sodium borohydride and 25 ml. of tetrahydrofuran at −20 to −30° C. with vigorous stirring over a period of 45 minutes. When the evolution of hydrogen ceased, 12 grams of hexamethyl phosphorous triamide was added to the reaction mixture at about 0° C. This reaction mixture was then stirred at room temperature for about 3 hours and at about 60° C. for an additional hour. Dilute hydrochloric acid was then added to render the mixture acidic. The resulting mixture was then shaken with hexane and filtered from the small amount of a yellow precipitate which formed. The filtrate consisted of two layers which were separated. The hexane layer was evaporated, leaving an oily residue which was then treated with a small amount of water. The oil became crystalline on standing, and the crystalline product was recovered by filtration, washed with water and dried on air. There was obtained 4.1 grams (46% of theory) of hexamethyl phosphorous triamide borane.

EXAMPLE X

Hexamethyl Phosphorous Triamide Borane

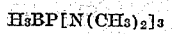

A solution of 1.82 grams of hydrogen chloride dissolved in 10 ml. of tetrahydrofuran was added to a mixture of 1.9 grams of sodium borohydride and 25 ml. of tetrahydrofuran at about −60° C. within a period of one hour. When the evolution of hydrogen ceased, 12 grams of hexamethyl phosphorous triamide was added. The reaction mixture was slowly heated to room temperature and maintained at that point for about 2 hours. It was then heated for one additional hour at about 45° C. The reaction mixture was then treated with sufficient dilute hydrochloric acid to hydrolyze the excess of hexamethyl phosphorous triamide and dissolve the solvent. Hexane was then added and the resulting mixture shaken. A small amount of a yellow precipitate was formed which was insoluble in hexane and was removed by filtration. The filtrate was evaporated, and the residue crystallized. There was obtained 5.6 grams (63% of theory) of hexamethyl phosphorous triamide borane.

In addition to the boranes prepared in the preceding examples, the following boranes are further illustrative of compounds coming within the scope of this invention:

Hexapropenyl phosphorous triamide borane
N,N',N''-(trimethyl) phosphorous triamide borane
Hexa-β-chloroethyl phosphorous triamide borane
Hexabenzyl phosphorous triamide borane
Hexacyclohexyl phosphorous triamide borane
N,N',N''-(tridodecyl) phosphorous triamide borane
Hexaphenyl phosphorous triamide borane
Tris (N-phenyl, N-methyl) phosphorous triamide borane
Tris (N-benzyl, N-ethyl) phosphorous triamide borane
N,N',N''-(triphenyl) phosphorous triamide borane
Tris (N-octyl, N-ethyl) phosphorous triamide borane
Tris (N-tolyl, N-methyl) phosphorous triamide borane The novel boranes of this invention display considerable utility and are of particular value as gasoline additives for the prevention of preignition. By way of example, tricresyl phosphate, a well-known pre-ignition suppressant, has been found to be only 60% as effective as certain of the compounds of this invention with regard to pre-ignition prevention. In addition, the new compounds of the invention find utility as anti-oxidants and as polymerization catalysts. They are also useful as blowing agents in epoxy resins representative of which would be the reaction product of bis(4-hydroxyphenyl)-2,2-propane and epichlorohydrin.

While the invention has been specifically described with regard to several embodiments, it is not thereby limited, and it is to be understood the variations and modifications thereof obvious to those skilled in the art may be made without departing from the spirit or scope of this invention.

What is claimed is:
1. Hexamethyl phosphorous triamide borane.
2. Hexaethyl phosphorous triamide borane.
3. Hexa-n-butyl phosphorous triamide borane.
4. N,N',N'' - (tetramethylene) phosphorous triamide borane.
5. The process of preparing a compound of the formula

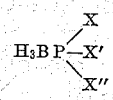

where X, X' and X'' each represent a member of the group consisting of

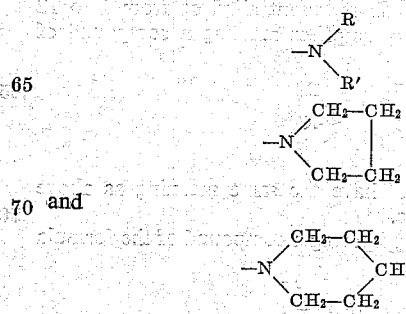

and wherein R and R' each represent alkyl of from 1 to 12 carbon atoms, which comprises reacting a compound of the formula

where X, X' and X'' have the same meaning as above with a borine group releasing compound selected from the group consisting of trialkylamine boranes, boron hydrides and metal borohydrides.

6. The process of preparing a compound of the formula

where X, X' and X'' each represent a member of the group consisting of

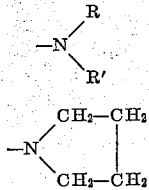

and

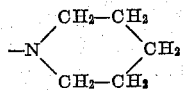

wherein R and R' each represent alkyl of from 1 to 12 carbon atoms, which comprises reacting a compound of the formula

where X, X' and X'' have the same meaning as above with a trialkylamine borane.

7. The process of preparing a compound of the formula

where X, X' and X'' each represent a member of the group consisting of

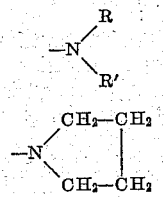

and

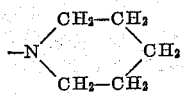

wherein R and R' each represent alkyl of from 1 to 12 carbon atoms, which comprises reacting a compound of the formula

where X, X' and X'' have the same meaning as above with a boron hydride.

8. The process of preparing a compound of the formula

where X, X' and X'' each represent a member of the group consisting of

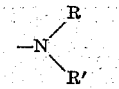

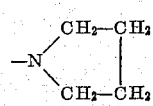

and

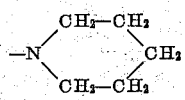

wherein R and R' each represent alkyl of from 1 to 12 carbon atoms, which comprises reacting a compound of the formula

where X, X' and X'' have the same meaning as above with trimethylamine borane.

9. The process of preparing a compound of the formula

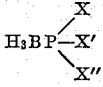

where X, X' and X'' each represent a member of the group consisting of

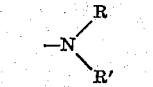

and

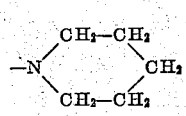

wherein R and R' each represent alkyl of from 1 to 12 carbon atoms, which comprises reacting a compound of the formula

where X, X' and X'' have the same meaning as above with diborane.

10. The process of preparing a compound of the formula

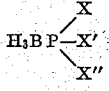

where X, X' and X'' each represent a member of the group consisting of

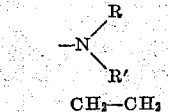

and

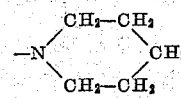

wherein R and R' each represent alkyl of from 1 to 12 carbon atoms, which comprises reacting a compound of the formula

where X, X' and X'' have the same meaning as above with sodium borohydride and carbon dioxide in the presence of an inert solvent.

11. The process of preparing a compound of the formula

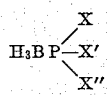

where X, X' and X'' each represent a member of the group consisting of

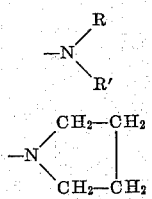

and

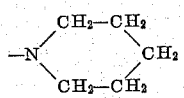

wherein R and R' each represent alkyl of from 1 to 12 carbon atoms, which comprises reacting a compound of the formula

where X, X' and X'' have the same meaning as above with sodium borohydride and acetic acid in the presence of an inert solvent.

12. The process of preparing a compound of the formula

where X, X' and X'' each represent a member of the group consisting of

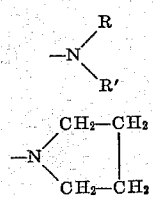

and

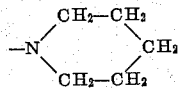

wherein R and R' each represent alkyl of from 1 to 12 carbon atoms, which comprises reacting a compound of the formula

where X, X' and X'' have the same meaning as above with sodium borohydride and hydrochloric acid in the presence of an inert solvent.

13. Hexabenzyl phosphorous triamide borane.
14. Hexaphenyl phosphorous triamide borane.
15. Tris(N-phenyl, N-methyl) phosphorous triamide borane.
16. Hexacyclohexyl phosphorous triamide borane.
17. A compound of the formula

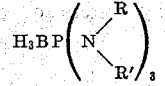

where R and R' are each alkyl of from 1 to 12 carbon atoms.

18. N,N',N''-(pentamethylene) phosphorous triamide borane.

19. A compound of the formula

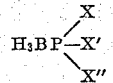

where X, X' and X'' each represent a member of the group consisting of

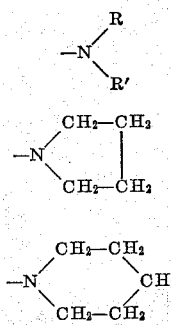

wherein R and R' are each selected from the group consisting of hydrogen, alkyl and mono and dihaloalkyl of from 1 to 12 carbon atoms, cycloalkyl and mono and dihalocycloalkyl of from 5 to 6 carbon atoms, monocyclic aromatic hydrocarbon of up to 8 carbon atoms and mono and dihalomonocyclic aromatic hydrocarbon of up to 8 carbon atoms, benzyl and mono and dihalobenzyl and naphthyl and mono and dihalonaphthyl, the halogen atoms of said mono and dihalo groups being selected from the group consisting of chlorine and bromine, provided that at least one of R and R' must be other than hydrogen.

20. The process of preparing a compound of the formula,

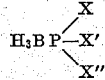

where X, X' and X'' each represent a member of the group consisting of

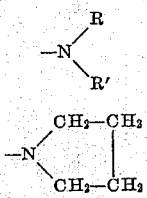

and

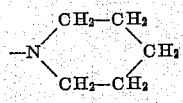

wherein R and R' each represent alkyl of from 1 to carbon atoms, which comprises reacting a compound of the formula,

where X, X' and X'' have the same meaning as above, with a metal borohydride and a promoter selected from the class consisting of carbon dioxide, dialkyl ketones, alkyl aldehydes, alkyl esters of saturated carboxylic acids, hydrohalic acids and saturated carboxylic acids of 1 to 5 carbon atoms.

References Cited in the file of this patent

Bergmann: The Chemistry of Acetylene and Related Compounds, page 80, Interscience Publishers, Inc., New York (1948).

Kadama: American Chemical Society, Abstract of Papers, 135th meeting, page 33M (1959).